United States Patent
Shepard et al.

(10) Patent No.: US 6,270,740 B2
(45) Date of Patent: Aug. 7, 2001

(54) METHOD OF PRODUCING MODIFIED SODIUM CARBONATE CRYSTALS FOR THE PRODUCTION OF SODIUM BICARBONATE

(75) Inventors: James Milo Shepard, Hockessin, DE (US); Victor Eugene Braman, Green River, WY (US); Kenneth Douglas Boyle, Green River, WY (US); Carter Jay Moore, Green River, WY (US)

(73) Assignee: General Chemical Corporation, Parsippany, NJ (US)

( * ) Notice: Subject to any disclaimer, the term of this patent is extended or adjusted under 35 U.S.C. 154(b) by 0 days.

(21) Appl. No.: 09/392,443

(22) Filed: Sep. 9, 1999

Related U.S. Application Data

(63) Continuation-in-part of application No. 08/821,397, filed on Mar. 20, 1997, now abandoned.

(51) Int. Cl.[7] .................. C01D 7/00; C01D 7/10
(52) U.S. Cl. .................. 423/422; 23/302 T; 423/421; 423/206.2
(58) Field of Search ................... 423/206.2, 266, 423/421, 422; 23/302 T

(56) References Cited

U.S. PATENT DOCUMENTS

| | | | |
|---|---|---|---|
| 3,084,026 | * 4/1963 | Frint et al. | 423/206.2 |
| 3,459,497 | * 8/1969 | Coglaiti et al. | 423/206.2 |
| 3,486,844 | * 12/1969 | Tabler | 423/206.2 |
| 3,498,744 | * 3/1970 | Frint et al. | 423/206.2 |
| 3,725,014 | * 4/1973 | Poncha et al. | 23/300 |
| 3,836,628 | * 9/1974 | Ilardi et al. | 423/266 |
| 3,838,189 | * 9/1974 | Sopchak et al. | 423/206.2 |
| 3,981,686 | 9/1976 | Lobunex et al. | 423/206.2 |
| 4,374,102 | 2/1983 | Connelly et al. | 423/206.2 |
| 4,472,280 | 9/1984 | Keeney | 423/206.2 |

* cited by examiner

Primary Examiner—Ngoc-Yen Nguyen
(74) Attorney, Agent, or Firm—Arthur J. Plantamura

(57) ABSTRACT

An improved method of purifying sodium carbonate from a natural source whereby a dissolved sodium carbonate product is treated with a cationic compound, such as a quaternary amine, to react with carbon-containing contaminants and filtering the product. The filtered modified sodium carbonate solution is then crystallized and dried. The modified sodium carbonate has a greater reactivity or uptake of carbon dioxide for the manufacture of sodium bicarbonate than conventional sodium carbonates.

8 Claims, 1 Drawing Sheet

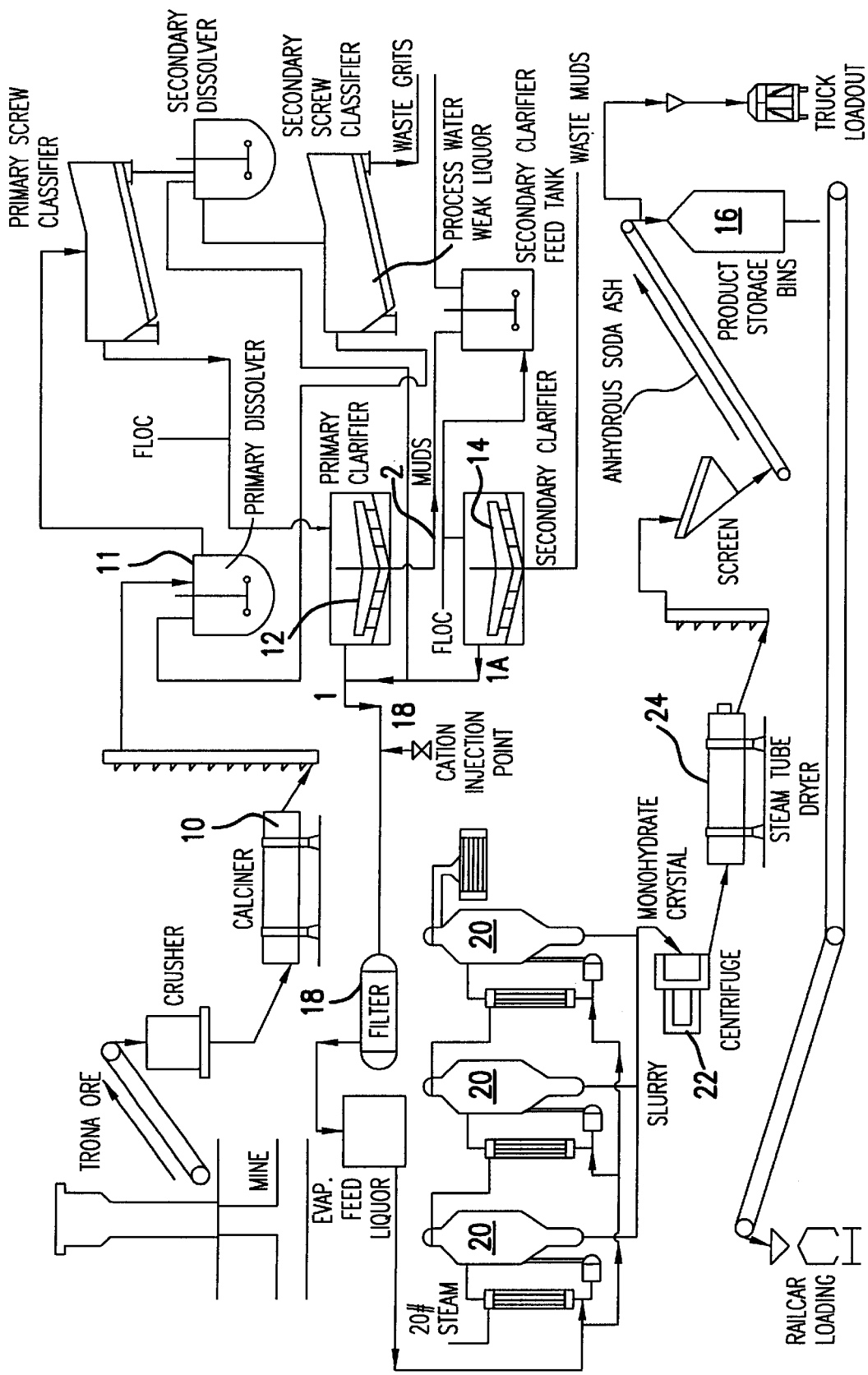

METHOD OF PRODUCING MODIFIED SODIUM CARBONATE CRYSTALS FOR THE PRODUCTION OF SODIUM BICARBONATE

This invention is a continuation-in-part of application Ser. No. 08/821,397 filed Mar. 20, 1997 now abandoned.

This invention relates to an improved process for producing an amended sodium carbonate product. More particularly, this invention relates to producing a sodium carbonate product that has an enhanced reactivity with carbon dioxide to produce sodium bicarbonate.

BACKGROUND OF THE INVENTION

Trona ore is mined and calcined for use in the manufacture of sodium carbonate, which in turn can be used to make sodium bicarbonate ($NaHCO_3$), a valuable product. The naturally occurring trona ore material generally has the formula $Na_3H(CO_3)_2 \cdot 2H_2O$, and is characterized as a hydroxyacid sodium carbonate. Trona is found in, or contiguous to, oil shale, and thus contains large amounts of organics, which it is desirable to remove from the sodium carbonate product. Unfortunately, insoluble organic and inorganic materials are contiguous in the trona ore, and are not easily separated. These impurities impact the characteristics of the final soda ash produced.

The processes used to produce soda ash from crude trona ore include various steps of calcination, dissolution of the converted soda ash to concentrated liquor, solids/liquids separation steps, filtration and/or purification, evaporation/crystallization, and drying the monohydrate formed to anhydrous soda ash for industrial use.

In accordance with the present commercial process, the crushed and calcined trona ore is treated with water to dissolve the soluble sodium carbonate product. The resultant liquid solution, or liquor, is clarified, decanted and then filtered to remove the solids. Treatment of the solution with activated carbon may follow to remove some portion of the organic materials. However, treatment with activated carbon is expensive. In addition to the high costs of the activated carbon itself, there are several auxiliary processing costs; the carbon must be filtered out after the carbon is sufficiently inactivated, requiring additional manpower, testing and filtering equipment, and the spent carbon must be disposed of, which is also expensive.

After the carbon treatment step, when used, the liquor is evaporated to obtain a crystallized sodium carbonate product. Antifoam agents are often added during this step to prevent foaming that would foul condensing liquids. These liquids are re-used as pure water when clean enough.

When the sodium carbonate product is to be used to make sodium bicarbonate, the anhydrous soda ash is dissolved in water and the resultant sodium carbonate solution is then reacted with carbon dioxide to form sodium bicarbonate in accordance with the following reaction:

$$Na_2CO_3 + CO_2 + H_2O \rightarrow 2NaHCO_3$$

However, even if treated with activated carbon, objectionably some organic materials from the anhydrous soda ash are passed on to the sodium bicarbonate process. This residual organic material interferes with the ability of the soda ash to react with carbon dioxide.

Thus considerable engineering skill is needed to maximize the carbon dioxide adsorption efficiency of sodium carbonate and the rate of sodium bicarbonate crystal formation from sodium carbonate. An improved method for modifying the sodium carbonate source that enhances the carbonation reaction would be highly advantageous.

SUMMARY OF THE INVENTION

We have found that the carbonation reaction to form sodium bicarbonate from sodium carbonate is enhanced when the sodium carbonate is produced using the process of the invention. In accordance with the present process, the addition of particular amounts of a cationic compound, e.g., a quaternary amine, to treat the 25–30% by weight sodium carbonate liquor prior to filtration, results in a modified sodium carbonate liquor product that, when crystallized and converted to an anhydrous product, is more readily carbonated with carbon dioxide in the production of sodium bicarbonate. The cationic additive reacts with organic materials in the sodium carbonate liquor to form solid polymeric by-products. Thus the treatment with a cationic compound is made prior to filtering the liquor. After filtering to remove the polymeric by-products and other solid materials, the liquor is evaporated to produce a purified and modified sodium carbonate. During the evaporation step, an antifoaming agent can be added to control foaming and ensure the ability to re-use the generated condensate.

BRIEF DESCRIPTION OF THE DRAWING

The Figure comprises a flow chart of the present process for producing an improved modified sodium carbonate product.

DETAILED DESCRIPTION OF THE INVENTION

Referring to the FIGURE, the flow chart depicts the sequence of steps employed to make the improved modified sodium carbonate product of the invention.

As shown, trona ore is mined and crushed and fed to a calciner 10 to burn off volatile products. The calcined product is removed from the calciner 10 and the soluble salts are dissolved in water in a tank 11 to form a 25–30% by weight soda ash solution, which in turn is fed to a clarifier 12. The supernatant liquor is removed through a line 1, and the solids remaining at the bottom of the clarifier 12 are removed through a line 2. The solids may be re-clarified in a second clarifier 14 and the supernatant solution withdrawn at line 1A and combined in line 1 with the product stream from the first clarifier 12.

A cationic additive is suitably injected into line 1, such as at a valve 16. The resultant liquor/additive solid polymeric reaction product is filtered in a filter 18. The filtered feed stream is evaporated by a single evaporator 20 where water is removed leaving a product slurry. Multiple evaporators, such as a second effect evaporator 20A and a third effect evaporator 20B can also be employed. An antifoam agent is added to the first effect evaporator 20 continuously and batch-wise to the second and third effect evaporators 20A and 20B solely to control foam generation. This slurry is fed to a centrifuge 22 where a modified monohydrate crystal sodium carbonate product is collected. This product is then fed to a steam tube dryer 24 where the water of hydration is removed. The resultant anhydrous sodium carbonate product is optionally and preferably screened and collected for storage in storage bins 26.

The cationic surfactant compounds useful in the invention include organo quaternary amines, but other cationic surfactants can be substituted. A particularly suitable cationic amine additive is the sulfonated ethylbis(hydroxyethyl)

tallow alkyl ethoxylated salt blended with diethylene glycol, commercially available as Maztreat® DF 82 from PPG Industries, Inc. The amine additive is injected into the mother liquor obtained from the primary clarifier 12 prior to filtering. The quantity of amine additive added to the liquor is from 0.017 to 0.021 gallons of amine per ton of soda ash produced. Forty to seventy percent of the total addition must be added to the filtration feed pipeline 1. The production rate of soda ash can be calculated based on the measured soda ash liquor concentrate and liquor feed rate entering the evaporator bodies 20, less system losses due to purge, centrifuge recycle and dryer losses caused by air flow entrainment and the like. Adherence to the present process sequence results in a modified anhydrous soda ash product with greatly improved reactivity, or uptake, of carbon dioxide to form sodium bicarbonate. About 110% or higher carbon dioxide uptake over that of an activated carbon-treated sodium carbonate product, and about 160% over that of the untreated prior art sodium carbonate product, is obtained when all the amine is added to the evaporators with no pre-filtration. Further, since the polymeric by-products formed by reaction of the cationic additive and the organic materials are filtered prior to feeding to the crystallizer, this does not exhaust the foam control capability of the residual amine. However, the addition of antifoaming agent directly to the second and third effect evaporators in a batch-wise manner may be reduced or even eliminated.

Organo quaternary amines have been used in the past to control foaming that occurs in the evaporator/crystallizer system. They are used as surfactants to decrease the surface tension of the liquor, thereby reducing foaming. However, the presence of these surfactants in the liquor, still containing organic materials, is thought to produce aliphatic carboxylic acids. Although the exact reason for the improved results in accordance with the present invention is not known with certainty, it is believed that it is these aliphatic organic acids that negatively affect the carbonation step.

The present process permits removal of more of the objectionable organic impurities in the original liquor, and the reactivity of the soda ash product is enhanced. The present product has the reactivity of a much purer soda ash, and thus more organics can be tolerated in the sodium carbonate product obtained in accordance with the invention. Thus the present process is more tolerant of changes in the organics content of the soda ash solutions, which may vary with their natural source.

Although the level of organics in the sodium carbonate solution in the evaporators may still be within the usual range of 200–300 ppm present in the feed stream after activated carbon treatment of the liquor, the use of the present cationic additives, in the required amounts, to the mother liquor prior to the filtration step, unexpectedly enhances the ability of the sodium carbonate to react with $CO_2$ in the carbonation step to form $NaHCO_3$. This enhancement in productivity is about 160%, a highly unexpected result. Further, foaming at the evaporator/crystallizer is controlled without increases in the addition rate, and the overall production costs for producing sodium bicarbonate from natural sources are unchanged.

Using a no-pre-filtration antifoam addition to the evaporators, the uptake of $CO_2$ to form sodium bicarbonate is about 0.0075 mols/min. Using an activated carbon treated sodium carbonate solution, the uptake reached about 0.011 mols/min, more than an order of magnitude higher.

Soda ash crystals produced using liquor produced by the operating plant, and crystals produced in the plant itself, and various feed points and feed concentrations were investigated to optimize the effectiveness of the process of the invention. The soda ash crystals produced using the process of the invention were further compared to results using various carbon filtering schemes. The results are summarized below.

First, it is important that the amine additive be introduced continuously into the liquor stream, rather than added to the evaporator batchwise as is typically done in monohydrate processes for foam control. In accordance with the invention, values above 0.018 mols/min have been achieved when at least 40–70% of the amine additive is added to the liquor which is filtered prior to evaporation/crystallization.

Second, it is also important that at least 0.010 gallons of amine additive per ton of soda ash to be produced be introduced into the liquor to initiate the improvement found herein. It is preferred that between 0.017 and 0.021 gallons of amine additive per ton of soda ash to be produced be added. The amine should primarily be introduced prior to the filtration step, but the balance can be added to control evaporator foaming.

When pre-filtration is not used, the reactivity for $CO_2$ adsorption in the sodium bicarbonate is only about 0.0075 mols/min. Using an activated carbon treated sodium carbonate solution, the uptake reached about 0.011 mols/min.

However, using the present process and a quaternary amine feed rate of 0.017–0.021 gallons/ton of soda ash produced, with at least 40–70% of the total amine added introduced prior to filtration, increases as high as 0.012 mols/min on average, with peak values of 0.017 mols/min uptake of carbon dioxide were achieved. The following Table illustrates the $CO_2$ uptake in mols/min taken at two different times about six months apart, i.e., "initial" and "second" uptake respectively, using the process of the present invention.

TABLE I

| Uptake | Initial % | Second % |
| --- | --- | --- |
| 0.0070 | 99.6 | 100 |
| 0.0090 | 85.8 | 100 |
| 0.0110 | 57.9 | 81.4 |
| 0.0130 | 28.7 | 50.8 |
| 0.0150 | 8.8 | 16.9 |
| 0.0170 | 2 | 3.4 |

Although the present invention has been described in terms of specific embodiments, other surfactants and their amounts can be substituted herein as will be known to one skilled in the art. The invention is only meant to be limited by the scope of the amended claims.

We claim:

1. A method for making sodium carbonate crystals from a natural source consisting essentially of the following steps in sequence:
    (a) crushing and calcining a natural sodium carbonate-containing product;
    (b) dissolving the calcined product in water;
    (c) decanting the resultant supernatant liquid from solid residues;
    (d) adding a cationic amine compound to the supernatant liquid from step (c) substantially continuously at a rate of about 0.017–0.21 gallons per ton of sodium carbonate produced to react with organic materials in the supernatant to form solid polymeric by-products;

(e) filtering to remove the by-product from the supernatant liquid; and (f) crystallizing the supernatant liquid of step e) to obtain sodium carbonate crystals.

2. A method according to claim 1 wherein said cationic amine compound is a quaternary amine.

3. A method of producing sodium bicarbonate comprising of the following steps in sequences:

(a) crushing and calcining a natural sodium carbonate-containing product;

(b) dissolving the calcined product in water;

(c) decanting the resultant supernatant liquid from solid residues;

(d) adding a cationic amine compound to the supernatant liquid from step (c) substantially continuously at a rate of about 0.017–0.21 gallons per ton of sodium carbonate produced to react with organic materials in the supernatant to form solid polymeric by-products;

(e) filtering to remove the by-product from the supernatant liquid;

(f) crystallizing the supernatant liquid of step e) to obtain sodium carbonate crystals; and (g) reacting the product of step (f) with water and carbon dioxide to produce sodium bicarbonate.

4. In a method of producing sodium bicarbonate from trona ore wherein the ore is crushed, calcined, dissolved in water, and the resultant supernatant liquid decanted from the solid residue, filtered and crystallized, the improvement cosisting essentially of adding a quaternary amine additive, at a rate of at least about 0.017 to 0.021 gallons per ton of sodium carbonate produced, prior to the filtration of said decanted supernatant liquid.

5. The method of claim 4 wherein the quaternary amine comprises sulfonated ethoxylated ethylbis(hydroxyethyl) tallow.

6. In a method of producing sodium carbonate from trona ore wherein the ore is crushed, calcined, dissolved in water and the resultant supernatant liquid decanted from the solid residue and filtered, the improvement consisting essentially of adding an amine additive at a rate of about 0.017–0.021 gallons per ton of sodium carbonate produced, prior to the filtration of said decanted supernatant liquid, such that the resultant sodium carbonate crystals, when dissolved in water, have increased reactivity with carbon dioxide so as to form sodium bicarbonate crystals at an increased rate as compared to when the sodium carbonate crystals were formed by the same process but without the addition of the amine additive.

7. A method according to claim 6 wherein the amine is added continuously to the decanted supernatant liquid.

8. A method according to claim 6 wherein the average reactivity with carbon dioxide is 0.012 mols/min.

* * * * *